United States Patent
Tounai et al.

(10) Patent No.: US 7,512,174 B2
(45) Date of Patent: Mar. 31, 2009

(54) TRANSMISSION DETERMINING METHOD IN A RECEPTION SIDE APPARATUS

(75) Inventors: Yuuya Tounai, Kanagawa (JP);
Masamitsu Nishikido, Kanagawa (JP);
Nobuyuki Tanaka, Kanagawa (JP);
Hidehiro Eguchi, Kanagawa (JP);
Syouichi Morokuma, Kanagawa (JP);
Toru Onuki, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 644 days.

(21) Appl. No.: 11/239,526

(22) Filed: Sep. 28, 2005

(65) Prior Publication Data
US 2006/0067389 A1  Mar. 30, 2006

(30) Foreign Application Priority Data
Sep. 30, 2004  (JP)  ............................. 2004-286825

(51) Int. Cl.
*H04B 1/38* (2006.01)
*H04L 5/16* (2006.01)
(52) U.S. Cl. .......................... 375/220; 375/219; 455/73
(58) Field of Classification Search ................ 375/220, 375/219; 455/73
See application file for complete search history.

(56) References Cited

U.S. PATENT DOCUMENTS

2004/0063406 A1* 4/2004 Petrus et al. .............. 455/67.11
2005/0141461 A1* 6/2005 Hosein et al. ............... 370/335
2005/0238357 A1* 10/2005 Farrell ........................ 398/119

FOREIGN PATENT DOCUMENTS

JP     2002-199437     7/2002

* cited by examiner

*Primary Examiner*—David C Payne
*Assistant Examiner*—Brian J Stevens
(74) *Attorney, Agent, or Firm*—Hogan & Hartson LLP

(57) ABSTRACT

The invention determines a transmission power value or a data rate in transmission power control in a reception side apparatus. A communication apparatus includes a modulation class controlling portion for selecting one data rate, and transmits a communication signal having the selected one data rate to a communication apparatus. The communication apparatus includes a storage portion for storing necessary received power data, and a line quality calculating portion for acquiring received power data of the received communication signal, for acquiring transmission power remaining data representing a difference between a maximum transmittable power of the communication apparatus and a transmission power when the communication apparatus transmits the communication signal, and for determining a data rate based on maximum received power data estimated based on the transmission power remaining data and received power data, and necessary received power data, and transmits information on the data rate to the communication apparatus.

9 Claims, 5 Drawing Sheets

TRANSMISSION DETERMINING METHOD IN A RECEPTION SIDE APPARATUS

BACKGROUND OF THE INVENTION

The present invention relates to a communication system, a communication apparatus, and a transmission controlling method, and more particularly to a technique for determining a transmission method on a reception side.

Techniques such as transmission power control and link adaptation are used in mobile communication in some cases. Those techniques are adopted in order to enhance communication quality as much as possible in those cases of mobile communication where the electric wave propagation environment changes violently.

Patent document 1 discloses a concrete example of transmission power control. As disclosed in patent document 1, it has been common practice for transmission power to be controlled in order to suppress the power consumption in a communication apparatus and reduce the radio wave disturbance on other communication channels while maintaining communication quality.

[Patent document] JP 2002-199437 A

Here, in the above-mentioned conventional method, a reception side communication apparatus transmits information about a line quality situation of a communication which is received thereat to a transmission side communication apparatus. The transmission communication apparatus performs the transmission power control and data rate change control (link adaptation) based on the information about the line quality situation which is received thereat.

However, because of the adoption of such a method, the transmission side communication apparatus must execute processing for calculating a suitable transmission power and processing for selecting suitable data rate based on the line quality situation, and therefore must execute a lot of processing. In particular, a large amount of processing when a mobile station apparatus in mobile communication system becomes the transmission side communication apparatus becomes a serious problem in terms of promotion of low power consumption in the mobile station apparatus.

SUMMARY OF THE INVENTION

The present invention has been made in order to solve the above-mentioned problem, and it is therefore an object of the present invention to provide a communication system, a communication apparatus, and a transmission controlling method which enable a transmission power value in transmission power control or a data rate to be determined in a reception side apparatus.

In order to attain the above-mentioned object, according to an aspect of the present invention, there is provided a communication system including a first communication apparatus and a second communication apparatus adapted to communicate with each other, in which the first communication apparatus includes data rate selecting means for selecting one data rate from among a plurality of data rates, and communication signal transmitting means for transmitting a communication signal at the selected one data rate to the second communication apparatus, and the second communication apparatus includes necessary received power data storing means for storing therein necessary received power data in correspondence to each of the plurality of data rates, the necessary received power data being received power data representing a received power, receiving means for receiving the communication signal transmitted by the communication signal transmitting means, received power data acquiring means for acquiring received power data representing a received power of the communication signal received by the receiving means, transmission power remaining data acquiring means for acquiring transmission power remaining data representing a difference between a maximum transmittable power of the communication signal transmitting means and a transmission power when the communication signal transmitting means transmits the communication signal, data rate determining means for determining a data rate to be selected by the data rate selecting means based on maximum received power data estimated based on the acquired transmission power remaining data and the acquired received power data, and the necessary received power data, and data rate information transmitting means for transmitting data rate information representing the data rate determined by the data rate determining means to the first communication apparatus, the first communication apparatus further including data rate information receiving means for receiving the data rate information transmitted thereto, wherein the data rate selecting means selects the data rate in correspondence to the data rate represented by the data rate information.

According to the communication system of the aspect of the present invention, the second communication apparatus can determine the data rate of the communication signal transmitted thereto from the first communication apparatus. As a result, promotion of low power consumption in the first communication apparatus can be realized.

In addition, preferably, in the communication system, the data rate determining means includes data rate acquiring means for acquiring a data rate of the communication signal received by said receiving means, and current rate received power data acquiring means for acquiring current rate received power data from the necessary received power data stored by the necessary received power data storing means in correspondence to the acquired data rate, the current rate received power data being the necessary received power data stored by the necessary received power data storing means, and the data rate determining means determines a data rate to be selected by the data rate selecting means based on the maximum received power data and the current rate received power data as the necessary received power data. In this case, the data rate of the communication signal transmitted from the first communication apparatus can be determined based on the received power information on which is stored every data rate.

Preferably, in the communication system, the received power data acquiring means acquires the received power data over a predetermined time, and the data rate determining means determines a data rate to be selected by the data rate selecting means based on the maximum received power data estimated based on the transmission power remaining data acquired by the transmission power remaining data acquiring means and minimum received power data of the received power data acquired over the predetermined time by the received power data acquiring means, and the current rate received power data. In this case, the communication can be reliably made even after the data rate is changed.

Preferably, in the communication system, when the maximum received power data is smaller than the current rate received power data, the data rate determining means determines a data rate so that the data rate to be selected by the data rate selecting means is changed to a slower data rate. In this case, the data rate can be changed to the slower data rate.

Preferably, in the communication system, the data rate determining means further includes high rate received power data acquiring means for acquiring high rate received power data as the necessary received power data stored in correspondence to a data rate higher than the acquired data rate, and when the maximum received power data is larger than the high rate received power data, the data rate determining means determines a data rate so that the data rate to be selected by the data rate selecting means is changed to a higher data rate. In this case, the data rate can be changed to the higher data rate.

Also, preferably, in the communication system, the second communication apparatus further includes transmission power determining means for determining a transmission power, when the communication signal transmitting means transmits a communication signal, based on maximum received power data estimated based on the transmission power remaining data acquired by the transmission power remaining data acquiring means and the received power data acquired by the received power data acquiring means, and the necessary received power data, and transmission power change amount data transmitting means for transmitting transmission power change amount data representing a change amount of determined transmission power to the first communication apparatus, the first communication apparatus further including transmission power change amount data receiving means for receiving the transmission power change amount data transmitted by the transmission power change amount data transmitting means, and the communication signal transmitting means transmits a communication signal with a transmission power corresponding to a change amount of transmission power represented by the transmission power change amount data. In this case, the transmission power of the communication signal transmitted from the first communication apparatus can be determined in the second communication apparatus.

Preferably, in the communication system, the first communication apparatus further includes transmission power remaining data transmitting means for transmitting transmission power remaining data representing a difference between a maximum transmittable power of the communication signal transmitting means and a transmission power when the communication signal transmitting means transmits a communication signal to the second communication apparatus, and the transmission power remaining data acquiring means acquires the transmission power remaining data by receiving the transmission power remaining data transmitted by the transmission power remaining data transmitting means.

Also, preferably, in the communication system, the first communication apparatus further includes maximum transmittable power transmitting means for transmitting data on a maximum transmittable power of the communication signal transmitting means to the second communication apparatus, and transmission power transmitting means for transmitting data on a transmission power, when the communication signal transmitting means transmits a communication signal, to the second communication apparatus, and the transmission power remaining data acquiring means receives the data on the maximum transmittable power transmitted by the maximum transmittable power transmitting means and the data on the transmission power transmitted by the transmission power transmitting means and calculates a difference between the maximum transmittable power and the transmission power, thereby acquiring transmission power remaining data.

In addition, according to another aspect of the present invention, there is provided a communication apparatus including data rate selecting means for selecting one data rate from among a plurality of data rates, communication signal transmitting means for transmitting a communication signal at the selected one data rate to a counter communication apparatus, transmission power remaining data transmitting means for transmitting transmission power remaining data representing a difference between a maximum transmittable power of the communication signal transmitting means and a transmission power, when the communication signal transmitting means transmits a communication signal, to the counter communication apparatus, and data rate information receiving means for receiving data rate information transmitted from the counter communication apparatus in which the data rate selecting means selects a data rate in correspondence to the data rate represented by the data rate information.

In addition, according to still another aspect of the present invention, there is provided a communication apparatus including data rate selecting means for selecting one data rate from among a plurality of data rates, communication signal transmitting means for transmitting a communication signal at the selected one data rate to a counter communication apparatus, maximum transmittable power transmitting means for transmitting data on a maximum transmittable power of the communication signal transmitting means to the counter communication apparatus, transmission power transmitting means for transmitting data on a transmission power, when the communication signal transmitting means transmits a communication signal, to the counter communication apparatus, and data rate information receiving means for receiving data rate information transmitted thereto from the counter communication apparatus, in which the data rate selecting means selects a data rate in correspondence to the data rate represented by the data rate information.

Also, according to yet another aspect of the present invention, there is provided a communication apparatus including necessary received power data storing means for storing therein necessary received power data in correspondence to each of the plurality of data rates, the necessary received power data being received power data representing a received power; receiving means for receiving a communication signal transmitted thereto from a counter communication apparatus, received power data acquiring means for acquiring received power data representing a received power of the communication signal received by the receiving means, transmission power remaining data acquiring means for acquiring transmission power remaining data representing a difference between a maximum transmittable power of the counter communication apparatus and a transmission power when the counter communication apparatus transmits the communication signal, data rate determining means for determining a data rate to be selected by the data rate selecting means based on a maximum received power data estimated based on the transmission power remaining data acquired by the transmission power remaining data acquiring means and the received power data acquired by the received power data acquiring means, and the necessary received power data, and data rate information transmitting means for transmitting data rate information representing the data rate determined by the data rate determining means to the counter communication apparatus.

Moreover, according to a further aspect of the present invention, there is provided a transmission controlling method of performing transmission method control in a communication system including a first communication apparatus and a second communication apparatus adapted to communicate with each other, the transmission controlling method including a data rate selecting step of selecting one data rate from among a plurality of data rates, a communication signal transmitting step of transmitting a communication signal at the one data rate selected at the data rate selecting step, a receiving step of receiving the communication signal transmitted at the communication signal transmitting step in the second communication apparatus, a received power data acquisition step of acquiring received power data representing a received power of the communication signal received at the receiving step in the second communication apparatus, a transmission power remaining data acquisition step of acquiring transmission power remaining data representing a difference between a maximum transmittable power in the communication signal transmission step and a transmission power when the communication signal is transmitted in the communication signal transmission step in the second communication apparatus, a data rate determining step of determining a data rate to be selected in said data rate selecting step based on maximum received power data estimated based on the acquired transmission power remaining data and the acquired received power data, and necessary received power data stored by necessary received power data storing means for storing therein necessary received power data in correspondence to each of the plurality of data rates, the necessary received power data being received power data representing a received power, in the second communication apparatus, a data rate information transmitting step of transmitting data rate information representing the data rate determined at the data rate determining step from the second communication apparatus to the first communication apparatus, and a data rate information receiving step of receiving the data rate information transmitted at the data rate information transmitting step in the first communication apparatus, in which a data rate is selected in correspondence to the data rate represented by the data rate information in the data rate selection step.

DESCRIPTION OF THE PREFERRED
EMBODIMENT(S)

The preferred embodiments of the present invention will hereinafter be described in detail with reference to the accompanying drawings.

Figure 1:
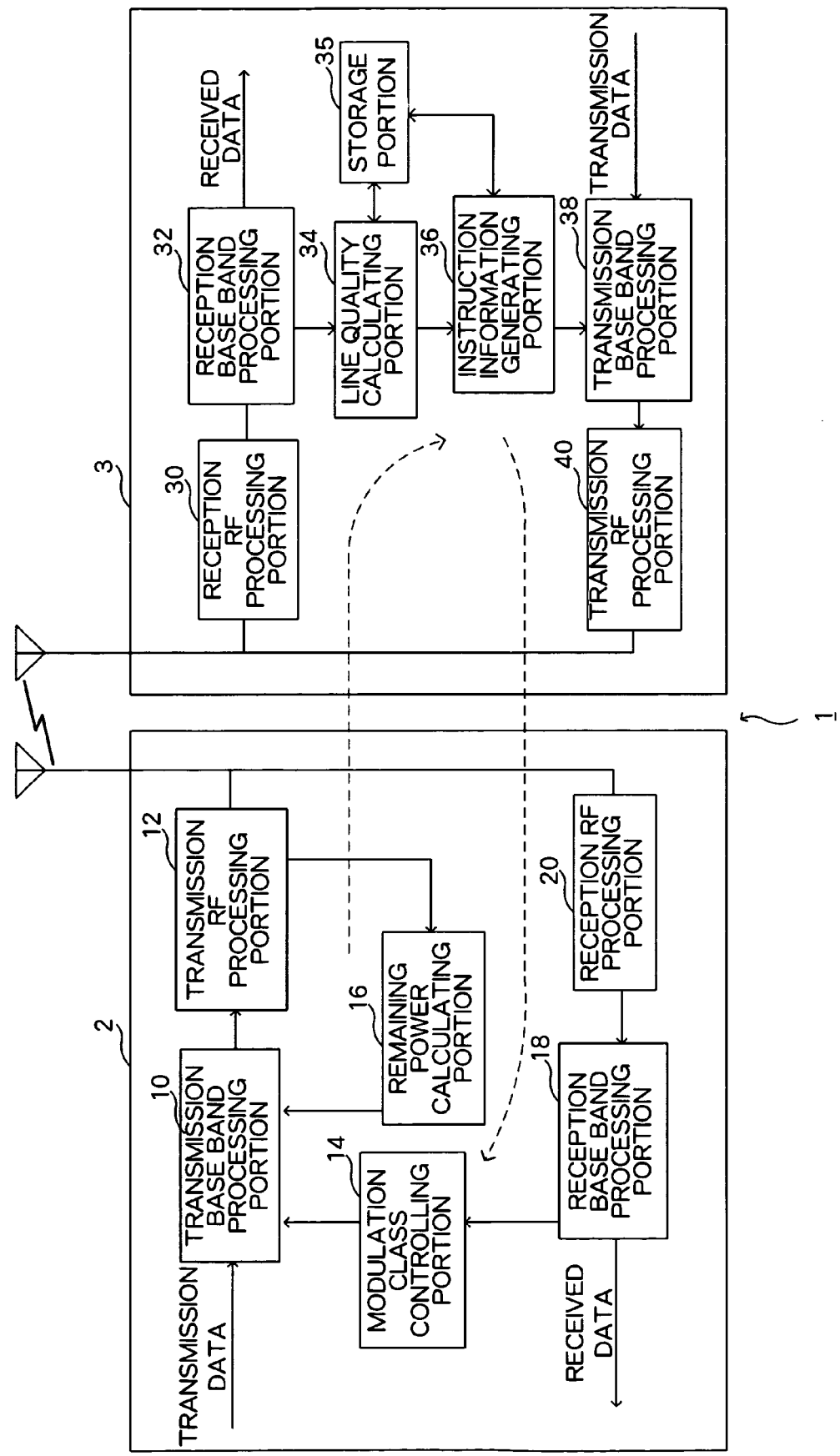
FIG. 1 is a functional block diagram showing a configuration of a communication system according to an embodiment of the present invention.

A communication system 1 according to an embodiment of the present invention, as shown in FIG. 1, is a communication system in which a communication apparatus 2 and a communication apparatus 3 make radio communication with each other. More specifically, the present invention, for example, is suitably applied to a case where the communication apparatus 2 is a mobile station in a mobile communication system, and the communication apparatus 3 is base station in the mobile communication system. Incidentally, FIG. 1 shows a functional block diagram of the communication apparatus 2 and the communication apparatus 3.

The communication apparatus 2, as shown in FIG. 1, includes a transmission base band processing portion 10, a transmission RF processing portion 12, a modulation class controlling portion 14, a remaining power data calculating portion 16, a reception base band processing portion 18, and a reception RF processing portion 20. In addition, the communication apparatus 3 includes a reception RF processing portion 30, a reception base band processing portion 32, a line quality calculating portion 34, a storage portion 35, an instruction information generating portion 36, a transmission base band processing portion 38, and a transmission RF processing portion 40.

Firstly, processing for transmitting/receiving a communication signal will be described. The communication signal means a signal which is transmitted from the communication apparatus 2 to the communication apparatus 3 to be received by the communication apparatus 3, or a signal which is transmitted/received in a direction opposite thereto. In this embodiment, the communication signal is transmitted/received based on a super-heterodyne system. Transmission data constituting the communication signal is inputted from a processing portion (not shown) in a preceding stage to the transmission base band processing portion 10. The transmission base band processing portion 10 modulates the transmission data based on modulation class data which is inputted from the modulation class controlling portion 14, thereby obtaining a modulated signal. All modulation classes such as QPSK, 8 PSK, and 16 QAM can be adopted as the modulation class. Those modulation classes are generally different in data rate from one another. Thus, the modulation class controlling portion 14 determines the modulation class from among those modulation classes and uses the determined modulation class while the determined modulation class is suitably changed by link adaptation which is mentioned later, whereby the modulation can be performed based on the optimum modulation class corresponding to a radio environment. In addition, the transmission base band processing portion 10 also executes the processing for controlling the transmission power of the modulated signal. More specifically, after setting the transmission power of the transmission signal to a given transmission power by controlling the amplitude of the modulated signal, the transmission base band processing portion 10 outputs the modulated signal to the transmission RF processing portion 12. Incidentally, the transmission base band processing portion 10 also receives as its input remaining power data from the remaining power data calculating portion 16. The transmission base band processing portion 10 transmits the remaining power data as one of the transmission data.

The modulated signal is then inputted to the transmission RF processing portion 12. In the transmission RF processing portion 12, the modulated signal is frequency converted into an intermediate frequency, frequency converted into a radio frequency, and amplified. Thereafter, the resulting signal is sent in the form of a radio signal to a radio section through an antenna provided in the communication apparatus 2.

In the communication apparatus 3, the radio signal transmitted thereto from the communication apparatus 2 is received at an antenna. The radio signal is then inputted as a received signal to the reception RF processing portion 30. In the reception RF processing portion 30, the radio signal is frequency converted into an intermediate frequency, frequency converted into a base band frequency, and amplified. The reception RF processing portion 30 outputs the received signal which has been frequency converted into the base band frequency to the reception base band processing portion 32. The reception base band processing portion 32 demodulates the received signal inputted thereto based on the modulation class used and outputs the resulting signal as received data to a processing portion (not shown) in a subsequent stage.

A Signal to Noise Ratio (SNR) of the signal inputted to the reception base band processing portion 32 is measured by the line quality calculating portion 34. The SNR is received power data representing the received power, and more precisely speaking, represents a ratio of the received power to the noise.

Figure 4:
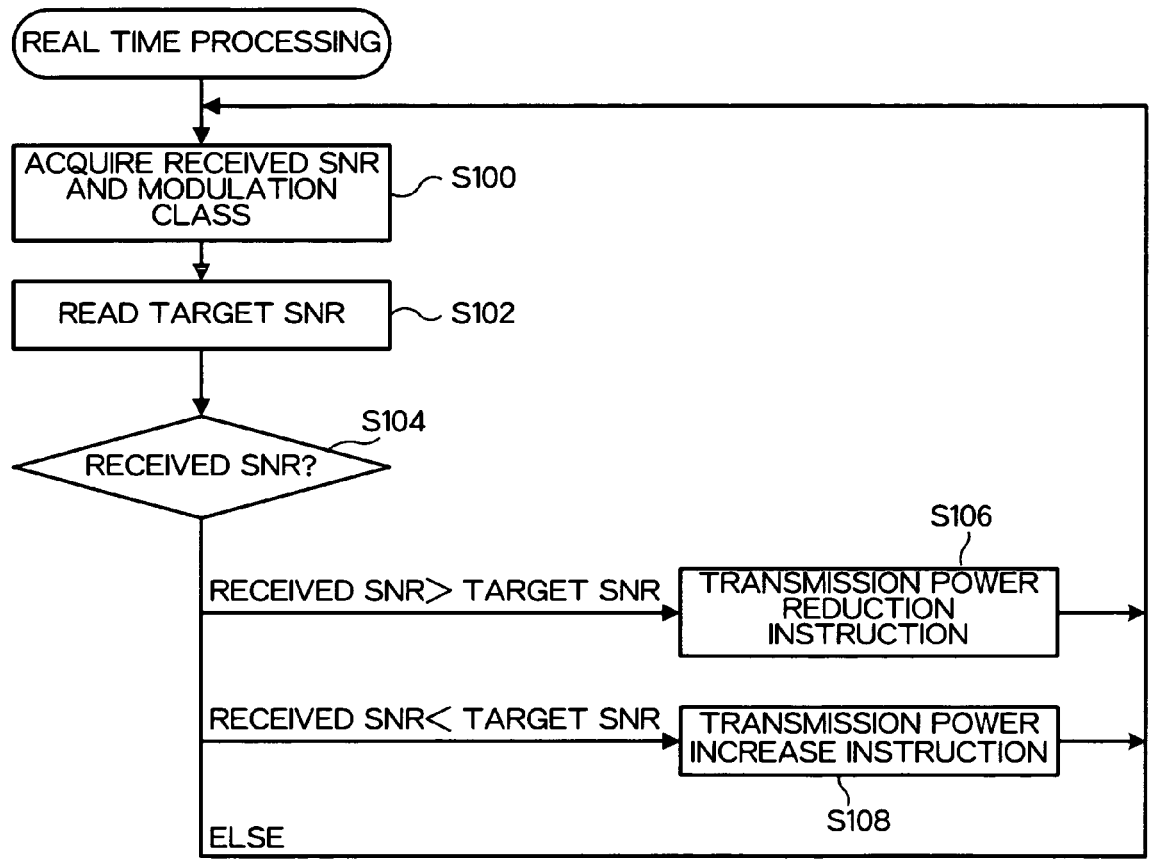
FIG. 4 is a processing flow chart explaining real time processing according to an embodiment of the present invention.

The communication apparatus 3 instructs the communication apparatus 2 to increase or decrease the transmission power in correspondence to the received power data. That is, target received power data (target SNR) is stored in the storage portion 35 in correspondence to each modulation class (data rate). Thus, the communication apparatus 2 controls the transmission power so that the transmission power approaches the corresponding target received power data. The target received power data means the data representing a received power sufficient to perform the demodulation when the radio communication is carried out based on the corresponding modulation class (data rate). FIG. 4 is a processing flow chart explaining the transmission power control processing. As shown in the figure, firstly, the line quality calculating portion 34 acquires the reception SNR of the communication signal and data on the modulation class of the communication signal (S100) and outputs the reception SNR and data on the modulation class of the communication signal to the instruction information generating portion 36. The instruction information generating portion 36 reads out the target SNR which is stored in the storage portion 35 in correspondence to the inputted data on the modulation class from the storage portion 35 (S102), and judges whether or not the reception SNR is higher than the target SNR (S104). When judging that the reception SNR is higher than the target SNR, the instruction information generating portion 36 determines to reduce the transmission power, and generates a transmission power reduction instruction in accordance with the determination, and transmits the transmission power reduction instruction to the communication apparatus 2 (S106). On the other hand, when judging that the reception SNR is lower than the target SNR, the instruction information generating portion 36 determines to increase the transmission power, generates a transmission power increase instruction in accordance with the determination, and transmits the transmission power increase instruction to the communication apparatus 2 (S108). It should be noted that when judging that the reception SNR is equal to the target SNR, the instruction information generating portion 36 determines not to change the transmission power, and generates no instruction information in this case. Preferably, such processing is executed at predetermined time intervals, and the transmission power is adjusted at the predetermined time intervals. In addition, such processing is called "real time processing" since it is executed whenever the reception SNR is acquired.

The above-mentioned description is an outline of the processing which is executed when the communication signal is transmitted from the communication apparatus 2 to the communication apparatus 3. This also applies to processing when the communication signal is transmitted from the communication apparatus 3 to the communication apparatus 2. That is, the transmission data is inputted to the transmission base band processing portion 38 of the communication apparatus 3. In the transmission base band processing portion 38, the same processing as the above-mentioned processing is executed. Then, the modulated signal generated through this processing is inputted to the transmission RF processing portion 40. In the transmission RF processing portion 40, the modulated signal is frequency converted into an intermediate frequency, frequency converted into a radio frequency, and amplified. The radio signal which is generated through this processing is then sent to a radio section through an antenna provided in the communication apparatus 3. The communication apparatus 2 receives the radio signal transmitted thereto from the communication apparatus 3 at its antenna. The radio signal is inputted as a received signal to the reception RF processing portion 20. In the reception RF processing portion 20, the radio signal is frequency converted into the intermediate frequency, frequency converted into the base band frequency, and amplified. The reception RF processing portion 20 outputs the received signal which has been frequency converted into the base band frequency to the reception base band processing portion 18. The reception base band processing portion 18 demodulates the received signal inputted thereto based on the modulated modulation class and outputs the resulting signal as received data to a processing portion (not shown) in a subsequent stage. Incidentally, the modulation class in the transmission base band processing portion 38 of the communication apparatus 3 is determined and controlled by a modulation class controlling portion (not shown) provided in the communication apparatus 3.

Next, transmission method controlling processing will be described. While in this case a description is given with respect to processing for controlling a method of transmitting a communication signal in the communication apparatus 2, a method of transmitting a communication signal in the communication apparatus 3 can also be controlled through the same processing.

Firstly, the remaining power data calculating portion 16 calculates the remaining power data, and inputs the remaining power data as the transmission data to the transmission base band processing portion 10. The remaining power data is defined as an example as "a maximum transmittable power" and "a transmission power which is actually used in the transmission", and also can be defined as another example as "a difference between the maximum transmittable power and the transmission power which is actually used in the transmission". Incidentally, when "the transmission power which is actually used in the transmission" or "the difference between the maximum transmittable power and the transmission power which is actually used in the transmission" is defined as at least a part of the remaining power data, the remaining power data thereon will be transmitted in transmitting the communication signal. On the other hand, when "the maximum transmittable power" is defined as a part of the remaining power data, the remaining power data on the maximum transmittable power can be previously transmitted. The reason for this is that since the maximum transmittable power is a maximum transmission power which is determined depending on the hardware of the communication apparatus 2, if, once the communication apparatus 3 is informed of the maximum transmittable power, the communication apparatus 3 stores "the maximum transmittable power" in the storage power 35 for every communication apparatus 2 in correspondence to the communication apparatus 2, "the maximum transmittable power" of the communication apparatus 2 concerned can therefore be read out and acquired unless that hardware is changed.

Figure 5:
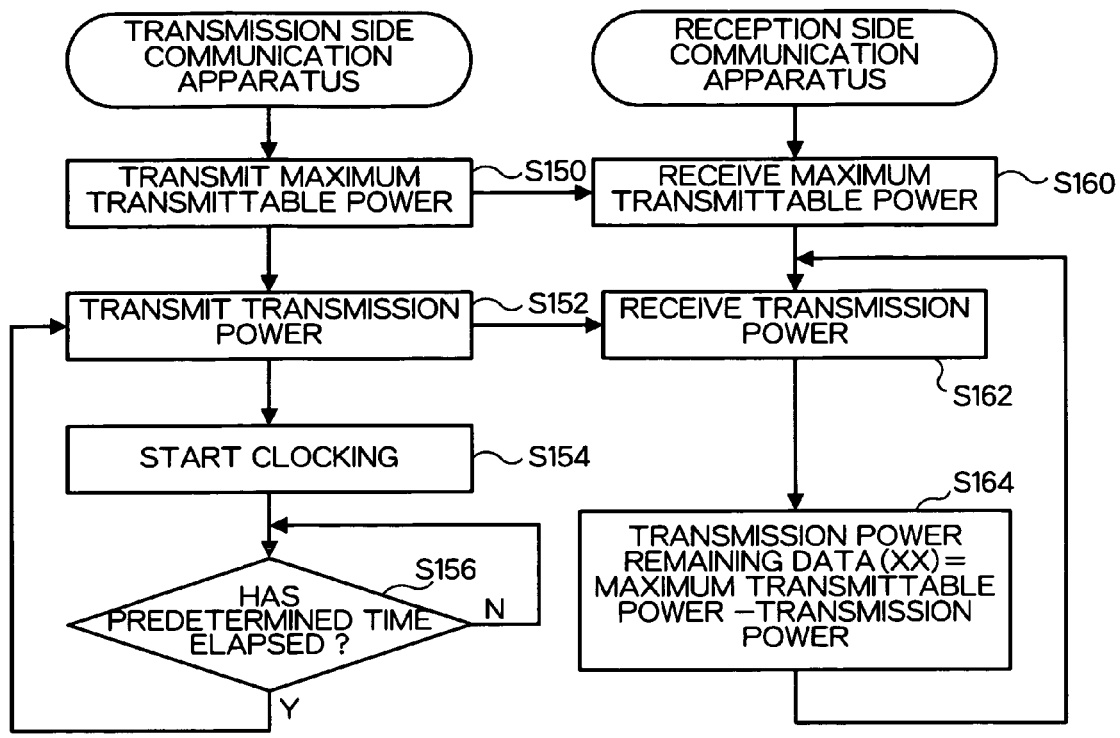
FIG. 5 is a processing flow chart explaining transmission power remaining data acquiring processing according to the embodiment of the present invention.

Here, processing for transmitting/receiving the remaining power data will be described in more detail with reference to a processing flow chart. Firstly, FIG. 5 is a flow chart explaining processing when the remaining power data is transmitted/received as "the maximum transmittable power" and "the transmission power which is actually used in the transmission". As described above, the data on "the maximum transmittable power" can be previously transmitted. For this reason, prior to other processing, the transmission side communication apparatus (the communication apparatus 2 in this case) transmits the data on "the maximum transmittable power" to the reception side communication apparatus (the communication apparatus 3 in this case) (S150). The reception side communication apparatus receives the data on "the maximum transmittable power" transmitted thereto (S160) and stores the received data in the storage portion 35.

Then, the transmission side communication apparatus transmits data on "the transmission power when the communication signal is transmitted" to the reception side communication apparatus (S152). The reception side communication apparatus receives the data on "the transmission power" (S162) and acquires a difference between "the maximum transmittable power" which is received in advance and "the transmission power" as the transmission power remaining data (Sl64). On the other hand, after transmitting the data on "the transmission power" (S152), the transmission side communication apparatus starts to measure time (S154) and judges whether or not a predetermined time has elapsed (S156). When judging that the predetermined time has elapsed, the transmission side communication apparatus transmits the data on "the transmission power when the communication signal is transmitted" at that time point again (S152). The reception side communication apparatus can acquire the newest transmission power remaining data at predetermined time intervals in such a manner.

Figure 6:
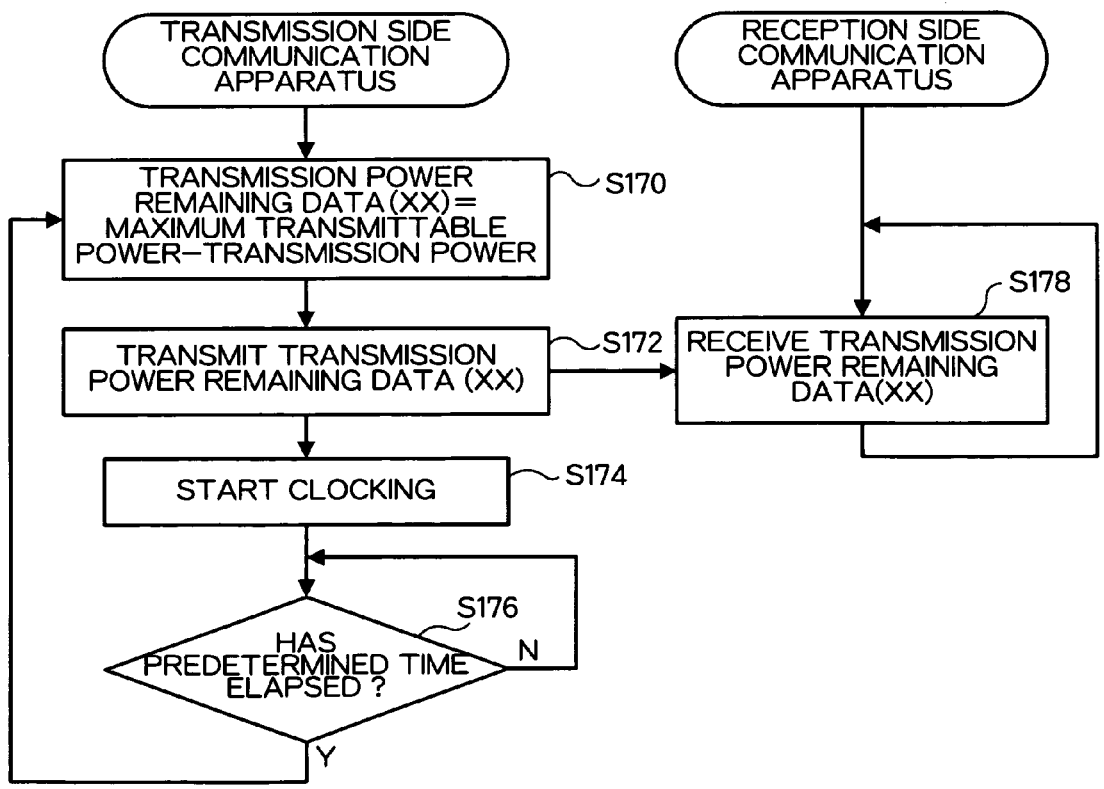
FIG. 6 is a processing flow chart explaining the transmission power remaining data acquiring processing according to the embodiment of the present invention.

FIG. 6 is a flow chart explaining processing when the remaining power data is transmitted/received as "the difference between the maximum transmittable power and the transmission power which is actually used in the transmission". In this case, the transmission side communication apparatus calculates a difference between the maximum transmittable power which is stored in a storage portion (not shown) and the transmission power when the communication signal is transmitted, thereby calculating transmission power remaining data (S170). Then, the transmission side communication apparatus transmits the resulting transmission power remaining data as the remaining power data to the reception side communication apparatus (S172). The reception side communication apparatus acquires the transmission power remaining data transmitted thereto through the reception (S178). After transmitting the transmission power remaining data (S172), the transmission side communication apparatus starts to measure time (S174), and judges whether or not a predetermined time has elapsed (S176). When judging that the predetermined time has elapsed, the transmission side communication apparatus calculates the transmission power remaining data at that time point again (S170) and transmits the transmission power remaining data (S172). In such a manner as well, the reception side communication apparatus can acquire the newest transmission power remaining data at predetermined time intervals.

At that time, a procedure may also be adopted such that the reception side communication apparatus transmits a signal representing a request to transmit the remaining power data to the transmission side communication apparatus, whereby the transmission side communication apparatus transmits the remaining power data in correspondence to that signal.

In the communication apparatus 3, the processing for acquiring the transmission power remaining data is executed by the line quality calculating portion 34. In such a manner, the line quality calculating portion 34 of the communication apparatus 3 can acquire the transmission power remaining data in addition to the received power data as the SNR. Such data is acquired for every communication performed between the communication apparatus 2 and the communication apparatus 3. The line quality calculating portion 34 outputs the transmission power remaining data to the instruction information generating portion 36.

In addition, the line quality calculating portion 34, as described above, also outputs data on the modulation class of a communication signal and the acquired received power data to the instruction information generating portion 36.

The instruction information generating portion 36 continues to acquire the received power data for a predetermined time and store the received power data thus acquired in the storage portion 35. That is, the instruction information generating portion 36 stores a plurality of received power data at predetermined time intervals. Then, the instruction information generating portion 36 estimates maximum received power data based on the received power data stored in the storage portion 35 and the newest transmission power remaining data. That is, the instruction information generating portion 36 estimates the received power data which is obtained when the communication apparatus 2 performs the transmission with the maximum transmittable power. More specifically, the maximum received power data can be defined as a sum of minimum received power data of the received power data stored at predetermined time intervals, and the transmission power remaining data. That is, the maximum received power which can be received under the worst electric wave propagation situation (when the received power becomes the minimum) becomes the maximum received power data (maximum SNR).

In addition, the instruction information generating portion 36 acquires the necessary received power data (necessary SNR) (assigned S1) which is stored in the storage portion 35 in correspondence to the modulation class (data rate) which is inputted from the line quality calculating portion 34, and the necessary received power data (necessary SNR) (assigned S2) which is stored in the storage portion 35 in correspondence to the modulation class which is one rank of data rate higher than that of the modulation class (data rate) which is inputted from the line quality calculating portion 34. Such necessary received power data is the data representing the received power which is required at least for the modulation when the radio communication is made based on the corresponding modulation class (data rate). The received power represented by the necessary received power data is normally less than that represented by the above-mentioned target received power data.

The modulation class and the transmission power when the communication signal is modulated in the communication apparatus are determined based on the maximum received power data and the necessary received power data. Firstly, our way of thinking about this processing will be described with reference to FIGS. 2 and 3.

Figure 2:
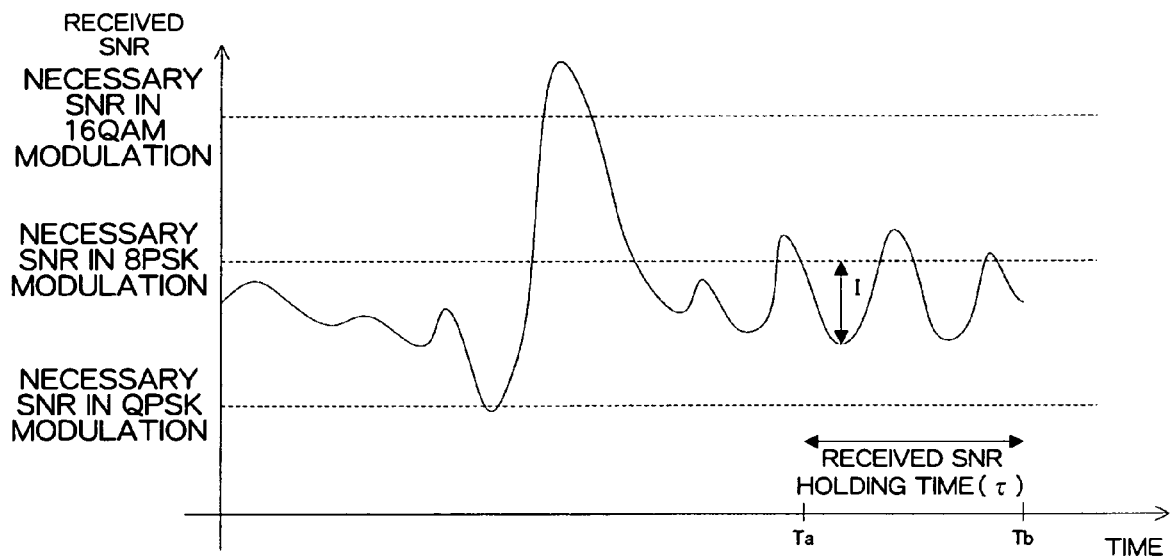
FIG. 2 is a graphical representation explaining a change in a received SNR according to an embodiment of the present invention.
Figure 3:
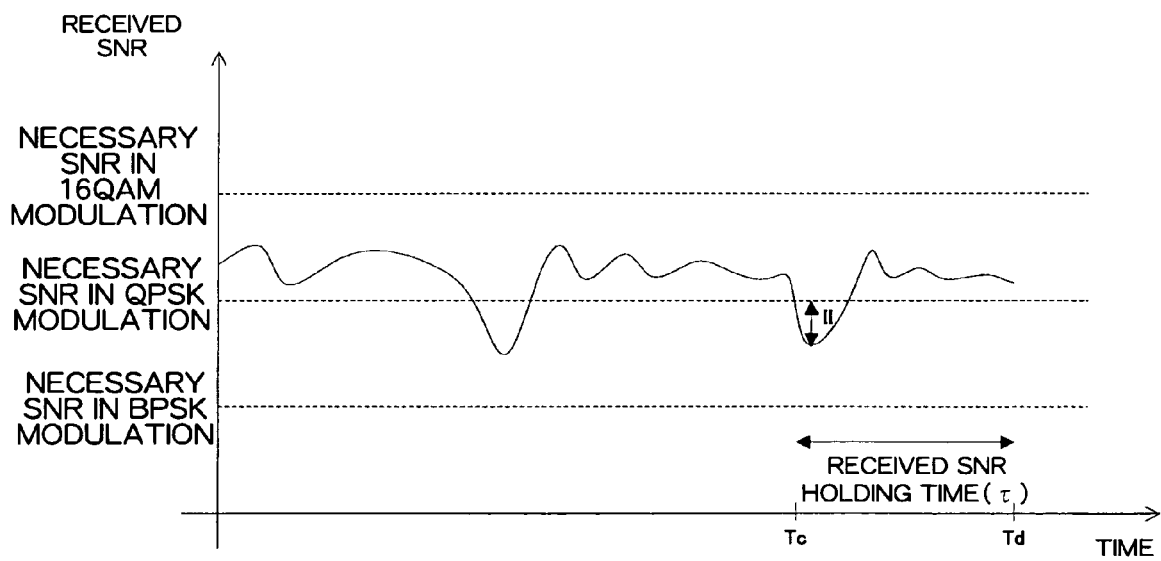
FIG. 3 is a graphical representation explaining a change in a received SNR according to the embodiment of the present invention.

FIGS. 2 and 3 are respectively graphs each showing a relationship between time and the received SNR. In those figures, an axis of ordinate represents the necessary SNR for each modulation class. Both these figures show a case where a current modulation class is QPSK. In this case, it is assumed that a modulation class which is one rank of data rate higher than QPSK is 8 PSK, and a modulation class which is one rank of data rate lower than QPSK is BPSK. Also, FIG. 2 shows a case where a necessary SNR of QPSK as the current modulation class is smaller than a minimum received SNR for a predetermined time τ from a time Ta to a time Tb. FIG. 3 shows a case where the necessary SNR of QPSK as the current modulation class is larger than the minimum received SNR for a predetermined time τ from a time Tc to a time Td. Referring to FIG. 2, when a difference (a portion I in the figure) between a necessary received SNR S2 (a necessary SNR in 8 PSK) and the minimum received SNR for the predetermined time τ is smaller than the transmission power remaining data, the modulation class is changed to 8PSK and the transmission power is increased by at least an amount corresponding to the difference between the necessary received SNR S2 and the minimum received SNR for the predetermined time τ, whereby the communication can be made at a data rate one-rank higher. On the other hand, referring to FIG. 3, when a difference (a portion II in the figure) between a necessary received SNR S1 (a necessary SNR in QPSK) and the minimum received SNR for the predetermined time τ is larger than the transmission power remaining data, the communication is suitably made at a data rate one-rank lower since the current modulation class can not be maintained.

Figure 7:
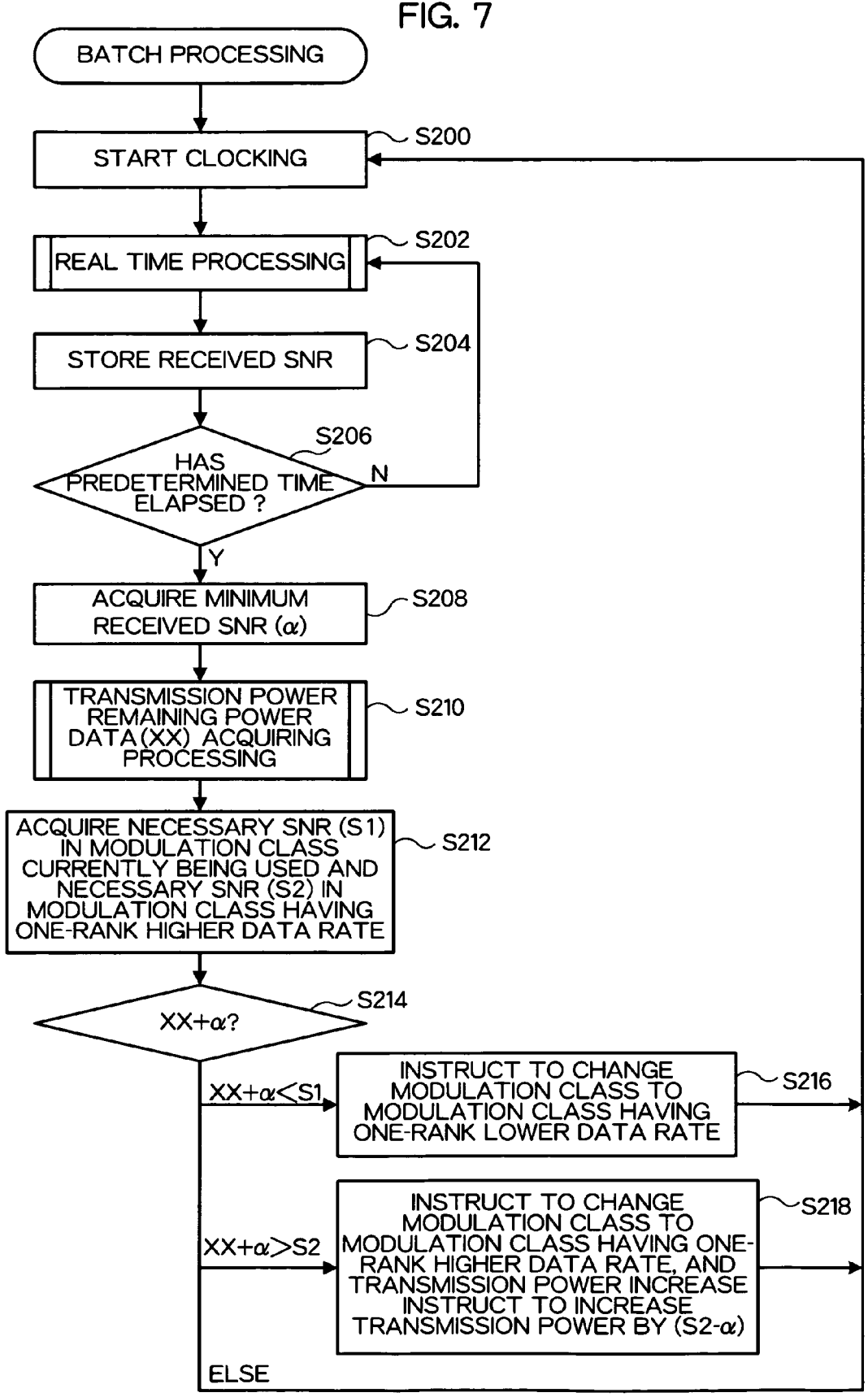
FIG. 7 is a processing flow chart explaining batch processing according to the embodiment of the present invention.

The modulation class when the communication signal is modulated in the communication apparatus 2 and the transmission power can be determined based on the maximum received power data and the necessary received power data in the manner as described above. This processing is called batch processing since it is executed at predetermined time intervals. Concrete processing in the batch processing will hereinafter be described with reference to FIG. 7. FIG. 7 is a flow chart showing processing executed in the communication apparatus 3. Firstly, the communication apparatus 3 starts to measure time (S200). Then, the above-mentioned real time processing is executed (S202) and the received SNR is stored in the storage portion 35 (S204). After a predetermined time has elapsed (S206), a minimum received SNR (assigned α) of the received SNRs stored at predetermined time intervals is acquired (S208). Moreover, processing for acquiring the transmission power remaining data (assigned XX) is executed (S210). Then, a necessary SNR (S1) based on a modulation class currently being used, and a necessary SNR (S2) based on a modulation class which is one rank of data rate higher than the modulation class currently being used are acquired through a readout process (S212). Processing corresponding to (XX+α), i.e., the value of the maximum SNR is then executed (S214). More specifically, when the maximum SNR is smaller than S1, an instruction to change the current modulation class to the modulation class having a one-rank lower data rate is issued since the current modulation class can not be maintained (S216). In addition, when the maximum SNR is larger than S2, in order to make higher speed communication, an instruction to change the current modulation class to the modulation class having a one-rank higher data rate is issued and a transmission power increase instruction to increase the transmission power by an amount corresponding to (S2−α) is issued so as to fulfill the necessary SNR based on that modulation class (S218). At that, when (XX+α) is equal to or larger than S1 but equal to or smaller than S2, the current modulation class is judged to be optimal and thus the modulation class and the transmission power are determined not to be changed. Incidentally, the transmission power is specially adjusted in the above-mentioned real time processing. Then, those instructions are transmitted as the communication signals from the instruction information generating portion 36 to the communication apparatus 2. The communication apparatus 2 changes the transmission power and the modulation class in accordance with those instructions, respectively.

As set forth hereinabove, according to the present invention, the reception side apparatus can determine the transmission power value in the transmission power control or can determine the data rate, and thus the amount of processing in the transmission side apparatus can be reduced. Consequently, this can contribute to the promotion of low power consumption, reduction in weight, etc. of the transmission side apparatus.

While there have been described what are at present considered to be preferred embodiments of the invention, it will be understood that various modifications may be made thereto, and it is intended that the appended claims cover all such modifications as fall within the true spirit and scope of the invention.

Further, the disclosure of Japanese Patent Application Nos. 2004-286825 filed on Sep. 30, 2004, including specification, claims, drawings and abstract is incorporated herein by reference in its entirety.

What is claimed is:

1. A communication system including a first communication apparatus and a second communication apparatus adapted to communicate with each other, wherein said first communication apparatus comprises:
    data rate selecting means for selecting one data rate from among a plurality of data rates; and
    communication signal transmitting means for transmitting a communication signal at the selected one data rate to the second communication apparatus,
said second communication apparatus comprises:
necessary received power data storing means for storing therein necessary received power data in correspondence to each of the plurality of data rates, the necessary received power data being received power data representing a received power;
receiving means for receiving the communication signal transmitted by said communication signal transmitting means;
received power data acquiring means for acquiring received power data representing a received power of the communication signal received by said receiving means;
transmission power remaining data acquiring means for acquiring transmission power remaining data representing a difference between a maximum transmittable power of said communication signal transmitting means and a transmission power when said communication signal transmitting means transmits the communication signal;
data rate determining means for determining a data rate to be selected by said data rate selecting means based on a maximum received power data estimated based on the acquired transmission power remaining data and the acquired received power data, and the necessary received power data; and
data rate information transmitting means for transmitting data rate information representing the data rate determined by said data rate determining means to said first communication apparatus,
said first communication apparatus further comprises
data rate information receiving means for receiving the data rate information transmitted thereto, wherein
said data rate selecting means selects the data rate in correspondence to the data rate represented by the data rate information,
wherein said data rate determining means comprises:

data rate acquiring means for acquiring a data rate of the communication signal received by said receiving means; and current rate received power data acquiring means for acquiring current rate received power data from the necessary received power data stored by said necessary received power data storing means in correspondence to the acquired data rate, the current rate received power data being the necessary received power data stored by said necessary received power data storing means, and said data rate determining means determines a data rate to be selected by said data rate selecting means based on the maximum received power data and the current rate received power data as the necessary received power data.

2. A communication system according to claim 1, wherein said received power data acquiring means acquires the received power data over a predetermined time, and said data rate determining means determines a data rate to be selected by said data rate selecting means based on the maximum received power data estimated based on the transmission power remaining data acquired by said transmission power remaining data acquiring means and minimum received power data of the received power data acquired over the predetermined time by said received power data acquiring means, and the current rate received power data.

3. A communication system according to claim 2, wherein when the maximum received power data is smaller than the current rate received power data, said data rate determining means determines a data rate so that the data rate to be selected by said data rate selecting means is changed to a slower data rate.

4. A communication system according to claim 2, wherein said data rate determining means further comprises high rate received power data acquiring means for acquiring high rate received power data as the necessary received power data stored in correspondence to a data rate higher than the acquired data rate, and when the maximum received power data is larger than the high rate received power data, said data rate determining means determines a data rate so that the data rate to be selected by said data rate selecting means is changed to a higher data rate.

5. A communication system according to claim 1, wherein said second communication apparatus further comprises:

transmission power determining means for determining a transmission power, when said communication signal transmitting means transmits a communication signal, based on maximum received power data estimated based on the transmission power remaining data acquired by said transmission power remaining data acquiring means and the received power data acquired by said received power data acquiring means, and the necessary received power data; and transmission power change amount data transmitting means for transmitting transmission power change amount data representing a change amount of determined transmission power to said first communication apparatus, said first communication apparatus further comprises transmission power change amount data receiving means for receiving the transmission power change amount data transmitted by said transmission power change amount data transmitting means, and said communication signal transmitting means transmits a communication signal with a transmission power corresponding to a change amount of transmission power represented by the transmission power change amount data.

6. A communication system according to claim 1, wherein said first communication apparatus further comprises transmission power remaining data transmitting means for transmitting transmission power remaining data representing a difference between a maximum transmittable power of said communication signal transmitting means and a transmission power when said communication signal transmitting means transmits a communication signal to said second communication apparatus, and said transmission power remaining data acquiring means acquires the transmission power remaining data by receiving the transmission power remaining data transmitted by said transmission power remaining data transmitting means.

7. A communication system according to claim 1, wherein said first communication apparatus further comprises:

maximum transmittable power transmitting means for transmitting data on a maximum transmittable power of said communication signal transmitting means to said second communication apparatus; and transmission power transmitting means for transmitting data on a transmission power, when said communication signal transmitting means transmits a communication signal, to said second communication apparatus, and said transmission power remaining data acquiring means receives the data on the maximum transmittable power transmitted by said maximum transmittable power transmitting means and the data on the transmission power transmitted by said transmission power transmitting means and calculates a difference between the maximum transmittable power and the transmission power, thereby acquiring transmission power remaining data.

8. A communication apparatus comprising:

necessary received power data storing means for storing therein necessary received power data in correspondence to each of the plurality of data rates, the necessary received power data being received power data representing a received power;

receiving means for receiving a communication signal transmitted thereto from a counter communication apparatus;

received power data acquiring means for acquiring received power data representing a received power of the communication signal received by said receiving means;

transmission power remaining data acquiring means for acquiring transmission power remaining data representing a difference between a maximum transmittable power of said counter communication apparatus and a transmission power when said counter communication apparatus transmits the communication signal;

data rate determining means for determining a data rate to be selected by said counter communication apparatus based on a maximum received power data estimated based on the transmission power remaining data acquired by said transmission power remaining data acquiring means and the received power data, and the necessary received power data acquired by said received power data acquiring means; and data rate information transmitting means for transmitting data rate information representing the data rate determined by said data rate determining means to said counter communication apparatus, wherein said data rate determining means comprises;

data rate acquiring means for acquiring a data rate of the communication signal received by said receiving means; and current rate received power data acquiring means for acquiring current rate received power data from the necessary received power data stored by said necessary received power data storing means in correspondence to the acquired data rate, the current rate received power data being the necessary received power data stored by said necessary received power data storing means, and said data rate determining means determines a data rate to be selected by said data rate selecting means based on the maximum received power data and the current rate received power data as the necessary received power data.

9. A transmission controlling method of performing transmission method control in a communication system including a first communication apparatus and a second communication apparatus adapted to communicate with each other, said transmission controlling method comprising:

a data rate selecting step of selecting one data rate from among a plurality of data rates;

a communication signal transmitting step of transmitting a communication signal at the one data rate selected at said data rate selecting step;

a receiving step of receiving the communication signal transmitted at said communication signal transmitting step in said second communication apparatus;

a received power data acquisition step of acquiring received power data representing a received power of the communication signal received at said receiving step in said second communication apparatus;

a transmission power remaining data acquisition step of acquiring transmission power remaining data representing a difference between a maximum transmittable power in said communication signal transmission step and a transmission power when the communication signal is transmitted in said communication signal transmission step in said second communication apparatus;

a data rate determining step of determining a data rate to be selected in said data rate selecting step based on a maximum received power data estimated based on the acquired transmission power remaining data and the acquired received power data, and necessary received power data stored by necessary received power data storing means for storing therein necessary received power data in correspondence to each of the plurality of data rates, the necessary received power data being received power data representing a received power, in said second communication apparatus;

a data rate information transmitting step of transmitting data rate information representing the data rate determined at said data rate determining step from said second communication apparatus to said first communication apparatus; and a data rate information receiving step of receiving the data rate information transmitted at said data rate information transmitting step in said first communication apparatus, wherein a data rate is selected in correspondence to the data rate represented by said data rate information in the data rate selecting step, wherein said data rate determining step comprises;

a data rate acquiring step of acquiring a data rate of the communication signal received at said receiving step; and a current rate received power data acquiring step of acquiring current rate received power data from the necessary received power data stored by said necessary received power data storing means in correspondence to the acquired data rate, the current rate received power data being the necessary received power data stored by said necessary received power data storing means, and said data rate determining step determines a data rate to be selected in said data rate selecting step based on the maximum received power data and the current rate received power data as the necessary received power data.

* * * * *